(12) United States Patent
Kim

(10) Patent No.: US 10,073,296 B2
(45) Date of Patent: Sep. 11, 2018

(54) DISPLAY DEVICE HAVING BACKLIGHT ASSEMBLY WITH TRANSPARENT MOLD FRAME

(71) Applicant: Samsung Display Co., Ltd., Yongin-si, Gyeonggi-do (KR)

(72) Inventor: Yong Il Kim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 337 days.

(21) Appl. No.: 14/734,907

(22) Filed: Jun. 9, 2015

(65) Prior Publication Data

US 2016/0011461 A1 Jan. 14, 2016

(30) Foreign Application Priority Data

Jul. 8, 2014 (KR) .................. 10-2014-0085019

(51) Int. Cl.
*G02F 1/1333* (2006.01)
*G02F 1/1335* (2006.01)

(52) U.S. Cl.
CPC .. *G02F 1/133608* (2013.01); *G02F 1/133605* (2013.01); *G02F 1/133603* (2013.01); *G02F 1/133606* (2013.01); *G02F 2001/133317* (2013.01); *G02F 2001/133613* (2013.01)

(58) Field of Classification Search
None
See application file for complete search history.

(56) References Cited

U.S. PATENT DOCUMENTS

| 7,969,526 B2 | 6/2011 | Yang et al. | |
|---|---|---|---|
| 2006/0164840 A1* | 7/2006 | Song | G02F 1/133603 362/341 |
| 2007/0002206 A1* | 1/2007 | Shirai | G02F 1/133308 349/58 |
| 2012/0262631 A1* | 10/2012 | Kuromizu | G02F 1/133603 348/725 |
| 2014/0204281 A1* | 7/2014 | Maeda | G02F 1/133611 348/794 |
| 2016/0011453 A1* | 1/2016 | Yoon | G02F 1/133608 349/58 |

FOREIGN PATENT DOCUMENTS

| KR | 10-2009-0060748 A | 6/2009 |
|---|---|---|
| KR | 10-2009-0100949 A | 9/2009 |
| KR | 10-2009-0107301 A | 10/2009 |
| KR | 10-2010-0058004 A | 6/2010 |
| KR | 10-2013-0126407 A | 11/2013 |

* cited by examiner

*Primary Examiner* — Richard Kim
(74) *Attorney, Agent, or Firm* — H.C. Park & Associates, PLC

(57) ABSTRACT

A display device includes: a display panel having a display area and a non-display area; a light source unit supplying light to the display panel; a bottom chassis on which the light source unit is disposed; a mold frame coupled to the bottom chassis; and a diffusion plate fixed to the mold frame and emitting light emitted from the light source unit to the display panel, wherein the mold frame may be transparent.

20 Claims, 10 Drawing Sheets

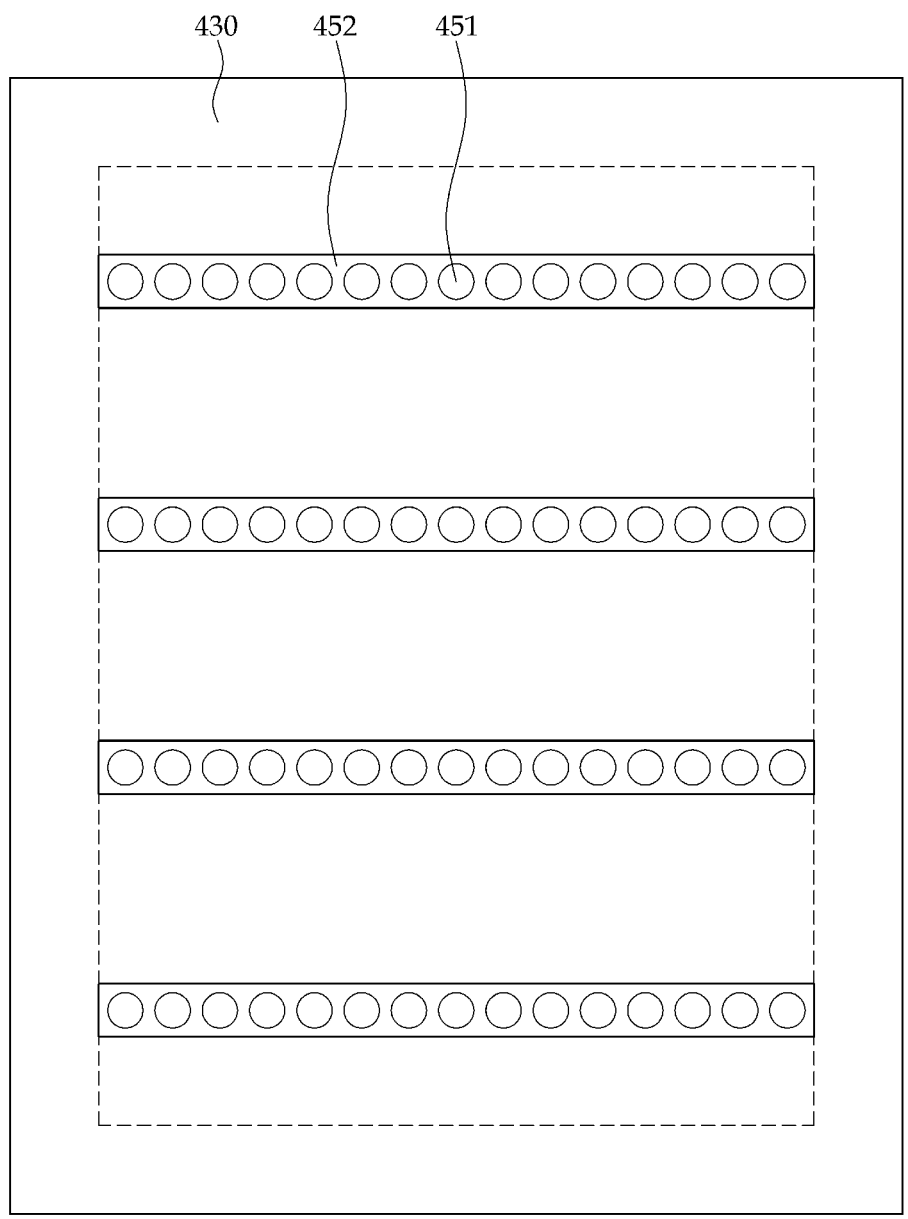

DISPLAY DEVICE HAVING BACKLIGHT ASSEMBLY WITH TRANSPARENT MOLD FRAME

CLAIM OF PRIORITY

This application claims priority to and all the benefits accruing under 35 U.S.C. § 119(a) from Korean Patent Application No. 10-2014-0085019 filed on Jul. 8, 2014, with the Korean Intellectual Property Office, the disclosure of which is incorporated herein in its entirety by reference.

BACKGROUND OF THE INVENTION

1. Field of Disclosure

The present disclosure of invention relates to a display device including a transparent mold frame configured to fix a diffusion plate.

2. Description of the Related Art

A liquid crystal display (LCD) is a type of flat panel displays (FPDs), which is the most widely used these days. The LCD includes two substrates including electrodes formed thereon and a liquid crystal layer interposed therebetween. Upon applying voltage to the electrodes, liquid crystal molecules of the liquid crystal layer are rearranged, thereby adjusting the amount of transmitted light.

A liquid crystal display (LCD), which is a passive light emitting device, includes a display panel configured to display an image and a backlight assembly configured to provide light to the display panel. The backlight assembly is classified into three types depending on the position of a light source unit: a direct type, an edge type, and a corner type.

Meanwhile, in order to realize a slim bezel, the bezel of the display device is becoming reduced. As the bezel becomes reduced, end portions of a diffusion plate and an optical plate disposed on the bezel may be visible from the outside, which results in nonuniform illumination and deterioration of image quality. Further, the diffusion plate and the optical sheet may contract and expand due to heat, such that further space is required.

Therefore, in order to secure a space for mounting the diffusion plate and the optical sheet and a space required due to the thermal expansion and contraction, it has been suggested to have a structure where the diffusion plate is fixed or supported between mold frames.

However, when the diffusion plate is fixed between the mold frames, the fixing portion of the mold frame configured to fix the diffusion plate may be seen as a dark area in the display area of the display device. Therefore, there needs to be a mold frame that can stably fix, hold or support the diffusion plate and is not seen as the dark area.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

The present disclosure of invention is directed to a display device including a transparent mold frame that fixes a diffusion plate and allows light to pass through.

According to an embodiment of the present invention, a display device may include: a display panel including a display area and a non-display area; a light source unit configured to supply light to the display panel; a bottom chassis on which the light source unit is disposed; a mold frame coupled to the bottom chassis; and a diffusion plate fixed to the mold frame and configured to emit light emitted from the light source unit to the display panel, wherein the mold frame may be transparent.

The display panel may be mounted on the mold frame.

The mold frame may include: a first mold unit having a side surface portion supporting the display panel and a first protrusion extended from the side surface portion and configured to fix the diffusion plate; and a second mold unit having a second protrusion on which the diffusion plate is mounted and a lower portion extended from and forming an acute angle with the second protrusion.

The first mold unit and the second mold unit may form an obtuse angle.

The side surface portion and the lower portion may form an obtuse angle.

The side surface portion may be in contact with the bottom chassis.

The side surface portion may be disposed in the non-display area.

The display device may further include a reflective sheet disposed between the bottom chassis and the side surface portion.

The display device may further include a reflective sheet disposed between the bottom chassis and the mold frame.

The display device may further include a reflective sheet disposed between the bottom chassis and the side surface portion.

According to an embodiment of the present invention, the mold frame may include: a first mold unit having an upper portion supporting the display panel, a side surface portion extended from the upper portion, and a first protrusion extended from the side surface portion and configured to fix the diffusion plate; and a second mold unit having a second protrusion on which the diffusion plate is mounted and a lower portion extended from and forming an acute angle with the second protrusion.

According to an embodiment of the present invention, the mold frame may include: a first mold unit having a hole inside and configured to fix the diffusion plate; and a second mold unit having a protrusion on which the diffusion plate is disposed and a lower portion extended from and forming an acute angle with the protrusion.

The display device may further include an optical sheet disposed between the display panel and the first mold unit.

The optical sheet may be mounted on the first mold unit.

The display device may further include a top chassis covering side surfaces of the bottom chassis and a part of a top surface of the display panel.

According to embodiments of the present invention, the display device can stably fix the display panel, the optical sheet, and the diffusion plate and the mold frame of the display device is not seen as a dark area on the border line between the display area and non-display area, thereby enhancing image quality.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 7A is a top plan view of a reflective sheet of an embodiment, having the light source unit includes a plurality of light sources spaced apart from each other having a uniform gap in width and length directions in a matrix form.

DETAILED DESCRIPTION OF THE INVENTION

Figure 1:
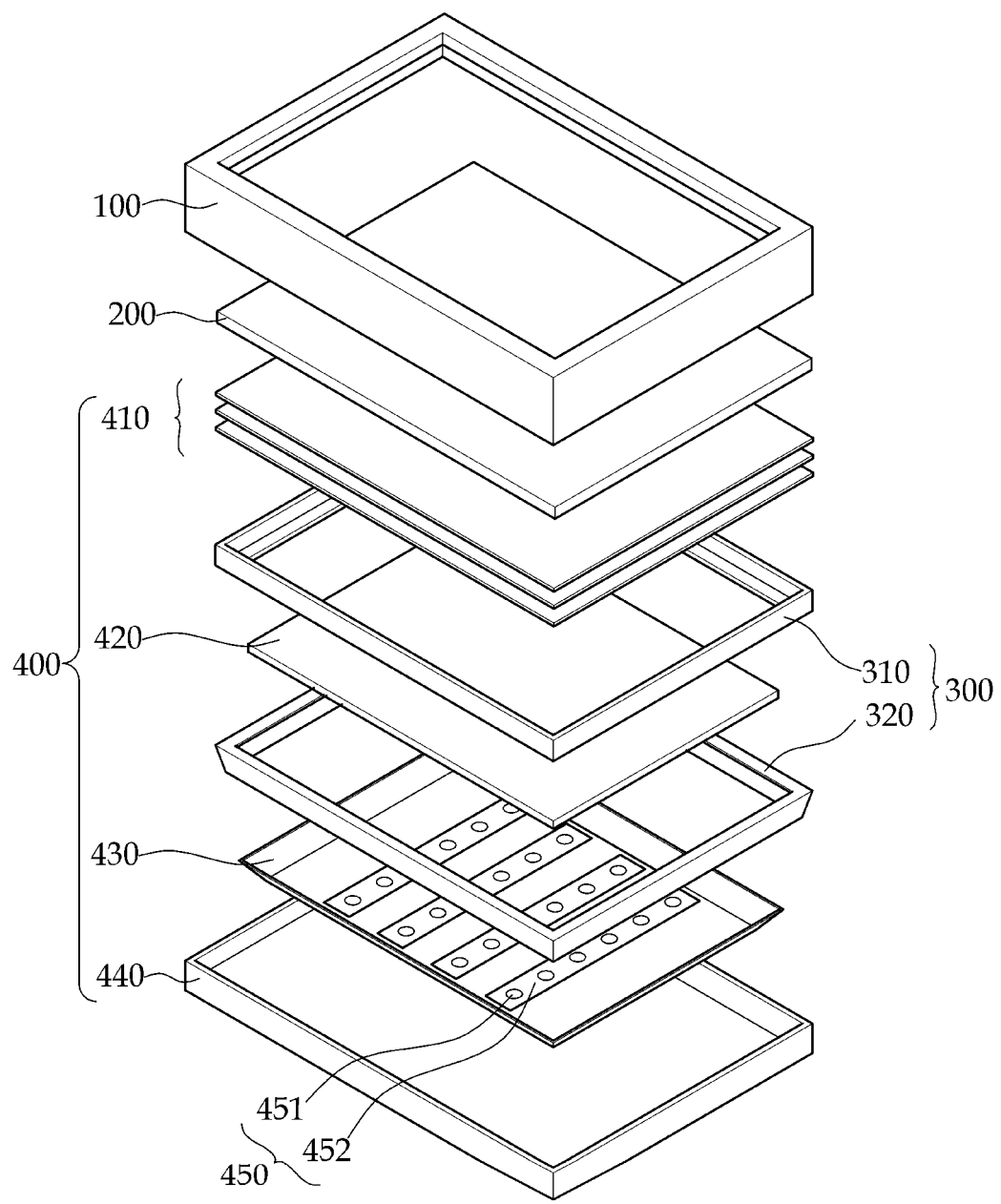
FIG. 1 is an exploded perspective view illustrating a display device according to an embodiment of the present invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a display device according to an embodiment of the present invention will be described with reference to FIGS. 1 and 2.

FIG. 1 is an exploded perspective view illustrating a display device according to an embodiment of the present invention. FIG. 2 is a cross-sectional view illustrating the display device of FIG. 1.

Figure 2:
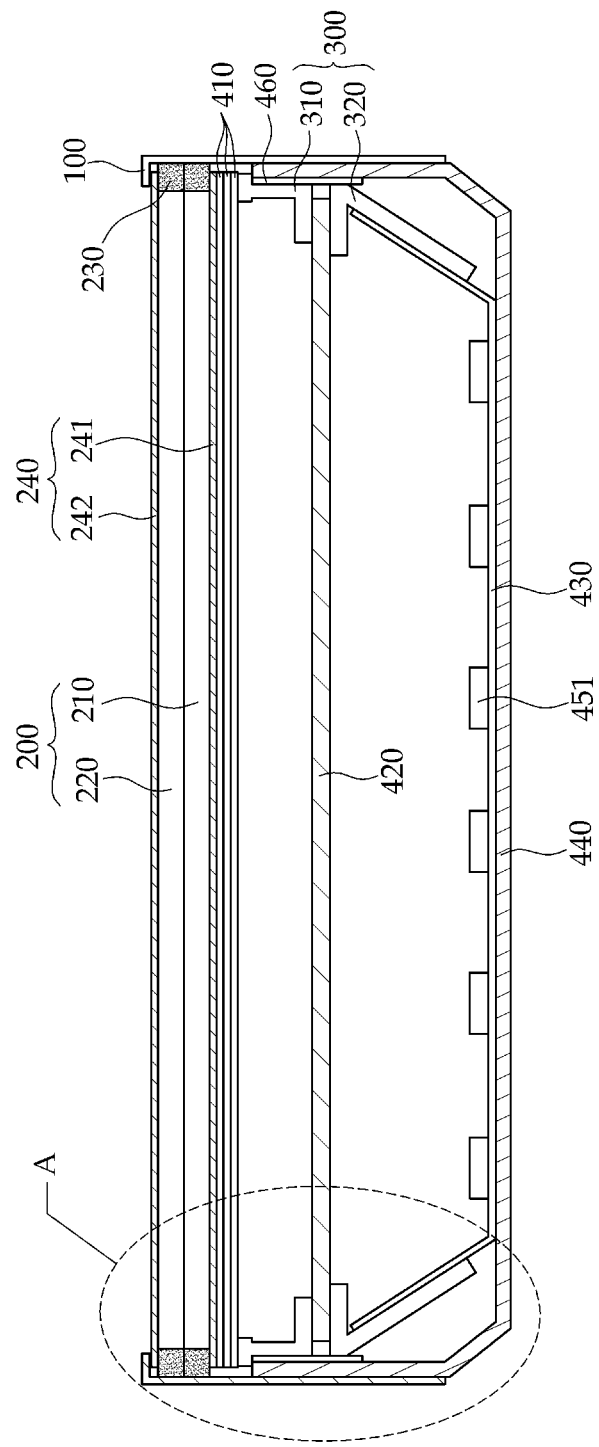
FIG. 2 is a cross-sectional view illustrating the display device of FIG. 1.

With reference to FIGS. 1 and 2, the display device includes a display panel 200 including a display area and a non-display area, a backlight assembly 400 configured to supply light to the display panel 200, a top chassis 100 provided to cover the display panel 200, and a mold frame 300 configured to accommodate the display panel 200 mounted thereon.

The top chassis 100 is coupled to the bottom chassis 440 so as to cover the display panel 200 mounted on the mold frame 300. The top chassis 100 has an open window located in the middle to expose the display panel 200.

The top chassis 100 may be coupled to the bottom chassis 440 by hooks and/or screws. Further, the top chassis 100 and the bottom chassis 440 can be coupled to each other in a variety of methods.

The display panel 200 is configured to display an image. The display panel 200 is a light-receiving type display panel and may be categorized into a liquid crystal display panel, an electrowetting display panel, an electrophoretic display panel, a microelectromechanical system display panel, and the like. It is assumed that the liquid display panel is used as an embodiment of the present invention.

The display panel 200 may be provided in a quadrilateral panel form having two pair of sides in parallel with each other. According to an embodiment of the present invention, the display panel 200 may have a quadrilateral form having a pair of long sides and a pair of short sides. The display panel 200 includes a first substrate 210, a second substrate 220 disposed to face the first substrate 210, and a liquid crystal layer (not illustrated) interposed between the first substrate 210 and the second substrate 220. The display panel 200 has, when viewed in a plan view, a display area on which an image is displayed and a non-display area 230 which surrounds a display area and does not display an image. The non-display area 230 is hidden by the top chassis 100.

The first substrate 210 may include a plurality of pixel electrodes (not illustrated) and a plurality of thin film transistors (not illustrated) electrically connected to the plurality of pixel electrodes in one-to-one correspondence. The respective thin film transistors function as switches of driving signals supplied to the corresponding pixel electrodes. Further, the second substrate 220 may include a common electrode (not illustrated) forming an electric field controlling an arrangement of the liquid crystal with the pixel electrodes. The display panel 200 drives the liquid crystal layer and plays a role in displaying an image.

The display panel 200 includes a driving chip (not illustrated), a tape carrier package (TCP) on which the driving chip is mounted, a printed circuit board (not illustrated) electrically connected to the display panel 200 through the TCP. The driving chip generates a driving signal to drive the display panel 200 in response to an external signal. The external signal refers to a signal supplied from the printed circuit board and may include image signals, a variety of control signals, and driving voltages.

The mold frame 300 is coupled to the bottom chassis 440 and accommodates the display panel 200, the optical sheet 410, and the diffusion plate 420. The mold frame 300 may be formed of a flexible material, such as plastics, in order to prevent damage on the display panel 200, the optical sheet 410, and the diffusion plate 420.

The mold frame 300 may be coupled to the top chassis 100. For example, screw holes may be formed on the top chassis 100, the bottom chassis 440, and the mold frame 300 and the top chassis 100, the bottom chassis 440, and the mold frame 300 may be coupled to each other at a time by a screw. Further, the top chassis 100, the bottom chassis 440, and the mold frame 300 may be coupled to each other in a variety of methods.

The mold frame 300 is provided along the edge portion of the display panel 200 and disposed under the mold frame 300 to support the display panel 200. The mold frame 300 may fix or support elements other than the display panel 200, such as the optical sheet 410 and the diffusion plate 420. More particularly, the mold frame 300 may have a structure where the diffusion plate 420 is inserted. The mold frame 300 may be provided on areas corresponding to four sides or at least a part of the four sides of the display panel 200. For example, the mold frame 300 may have a quadrilateral-loop form corresponding to four sides of the display panel 200, or may have a 'C' form corresponding to three sides of the edge portion of the display panel 200. The mold frame 300 may be formed as a single unit; however, a plurality of units may be assembled to form the mold frame 300, where necessary.

The backlight assembly 400 includes the optical sheet 410, the diffusion plate 420, a reflective sheet 430, the bottom chassis 440, and a light source unit 450.

The light source unit 450 includes at least one light source 451 and a circuit substrate 452 on which the light source 451 is disposed. The light source unit 450 may be disposed at a bottom portion of the display panel 200. For example, the light source unit 450 may be disposed on a bottom surface of the reflective sheet 430 or on a bottom surface of the bottom chassis 440.

The circuit substrate 452 has a quadrilateral form and may have a reflective surface. For example, surfaces of the circuit substrate 452 may be coated with a material having reflectance property. Further, the circuit substrate 452 may be manufactured with a metal material to perform functions of heat dissipation and accommodation. In this case, any metal material can be used without limitation and thus a variety of metal materials having high thermal conductivity can be used.

Figure 7B:
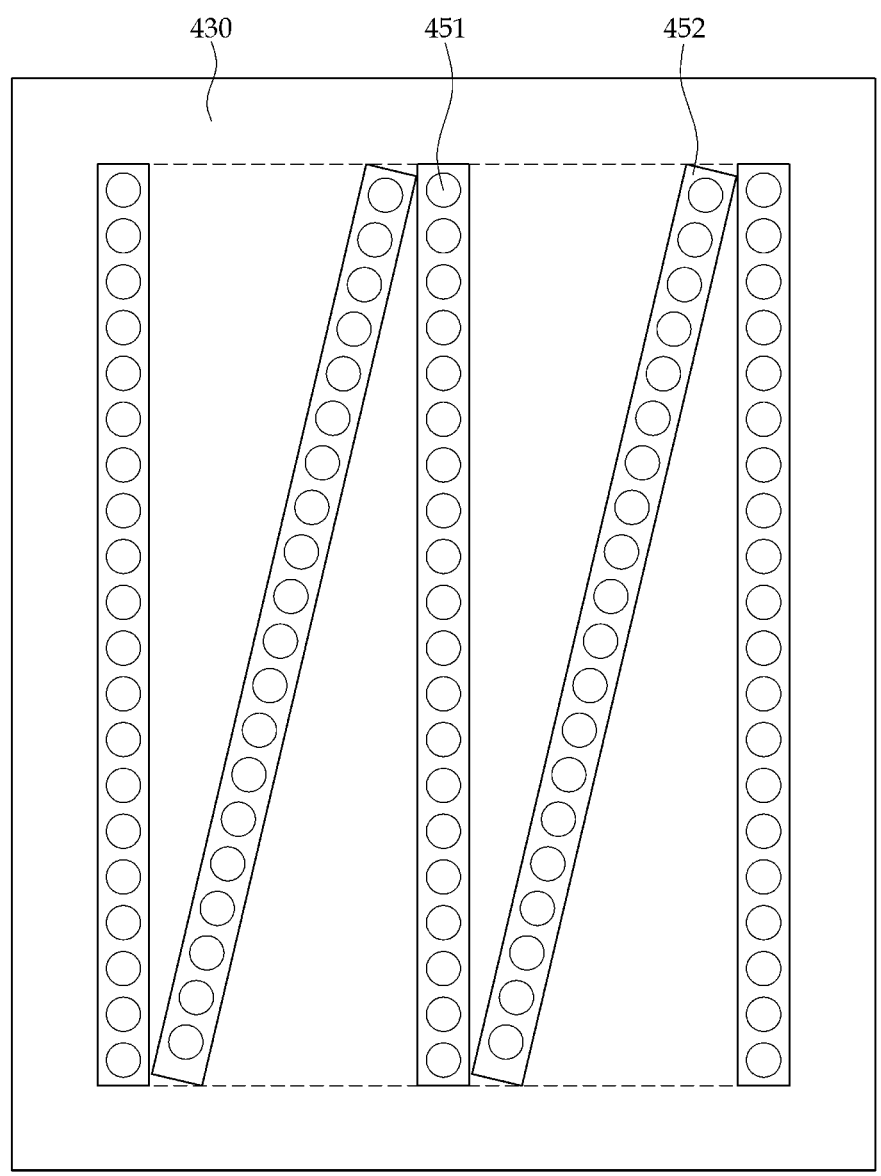
FIG. 7B is a top plan view of a reflective sheet of an embodiment, the light source unit includes a plurality of light sources disposed in a row in a length direction but disposed in zigzag in a width direction.
Figure 7C:
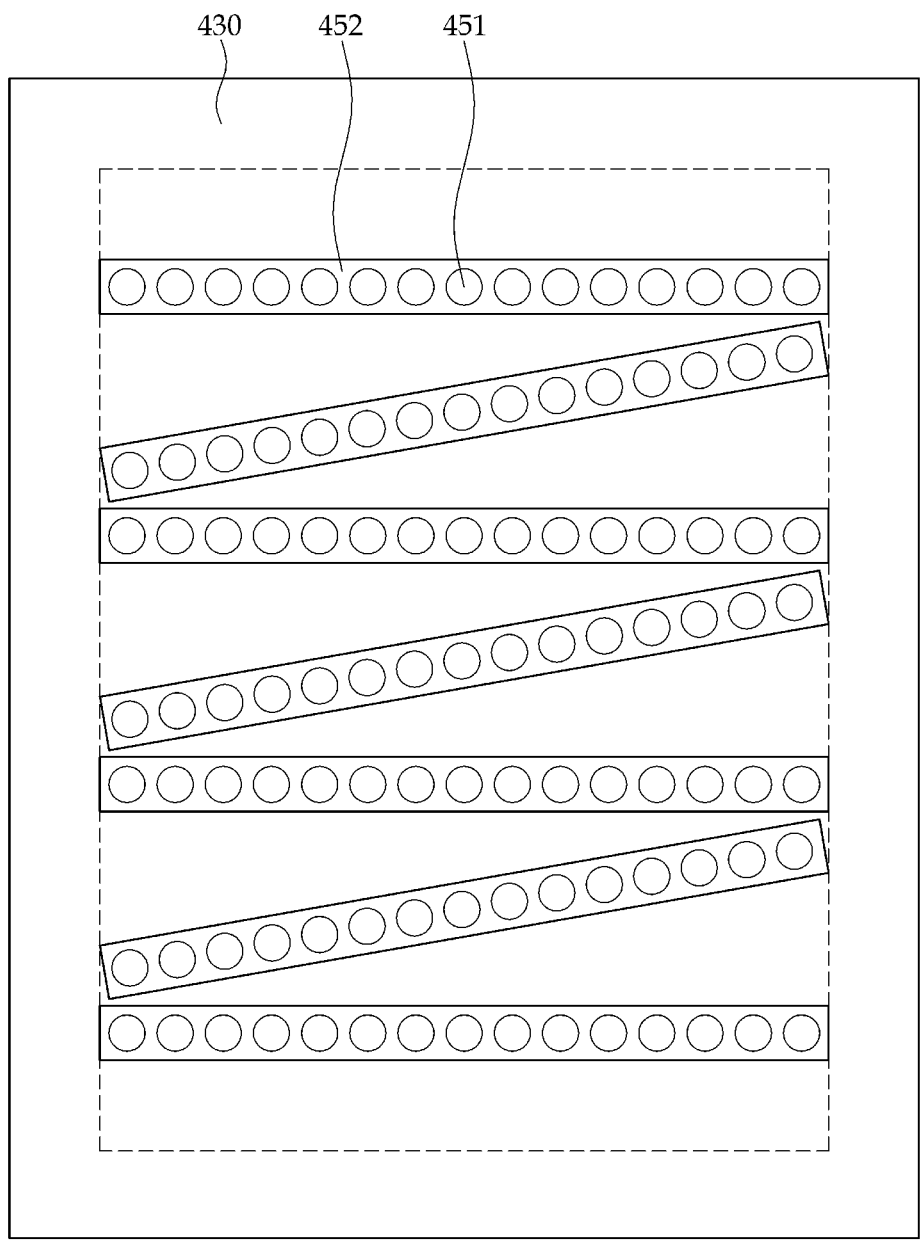
FIG. 7C is a top plan view of a reflective sheet of an embodiment, the light source unit includes a plurality of light sources disposed in a row in a width direction but disposed in zigzag in a length direction.
Figure 8:
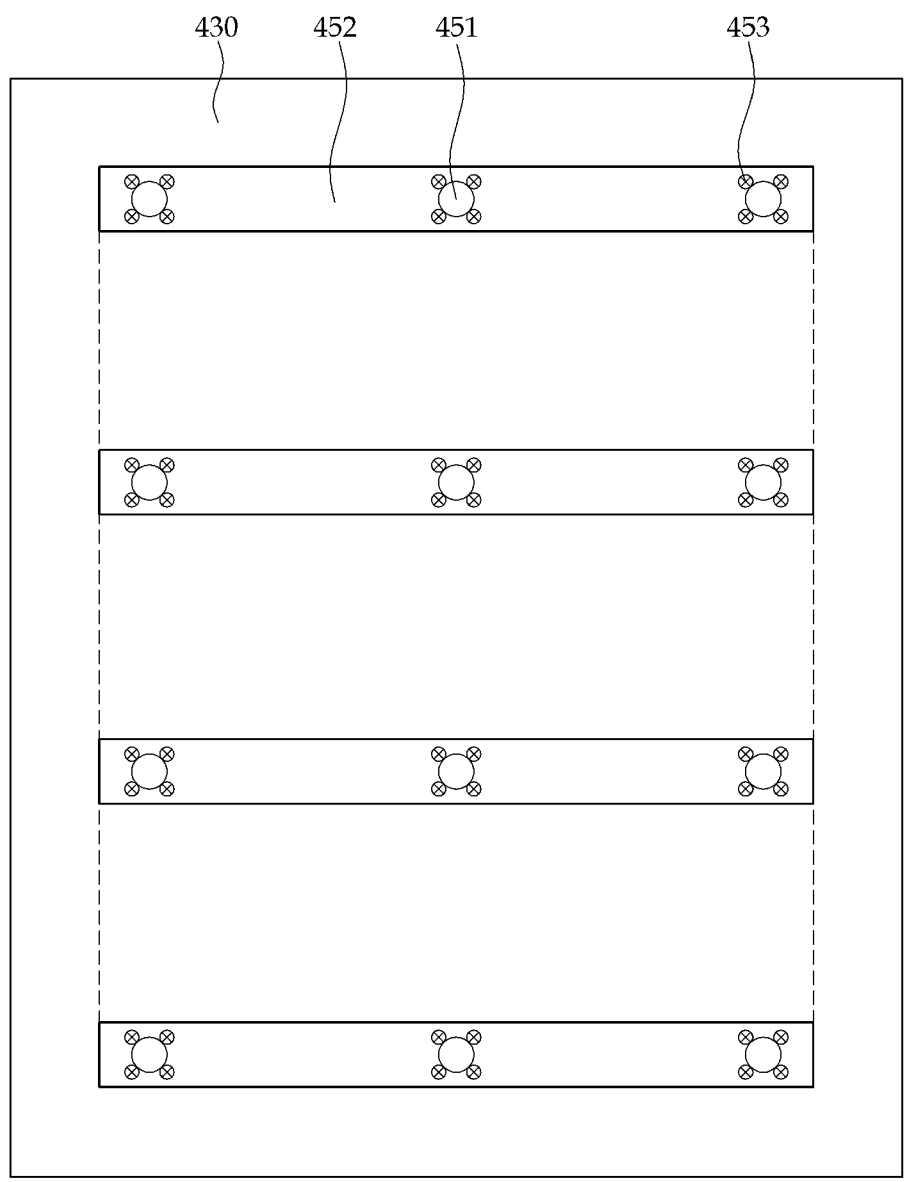
FIG. 8 is a top plan view of a reflective sheet of an embodiment, having coupling holes formed on the circuit substrates to allow coupling members to be inserted.

The light source 451 may include a light emitting diode (LED) and the like. The plurality of light sources 451 provides light for display devices to display image information. Light emitted from the light source 451 is guided toward the display panel 200 through the diffusion plate 420 and the optical sheet 410. The light sources 451 may be spaced apart from each other having a predetermined gap in order to achieve luminance uniformity of the light source unit 450. In some embodiments, the plurality of light sources 451 may be spaced apart from each other having a uniform gap in width and length directions in a matrix form (FIG. 7A). In some embodiments, the light sources 451 may be disposed in a row in a length direction but disposed in zigzag in a width direction (FIG. 7B). In some embodiments, the light sources 451 may be disposed in a row in a width direction but disposed in zigzag in a length direction (FIG. 7C). However, embodiments of the present invention are not limited thereto, and thus the light sources 451 may be disposed on the circuit substrate 452 in a variety of ways in order to achieve the luminance uniformity. Further, a coupling hole (not illustrated) may be formed on the circuit substrate 452 to allow a coupling member 453 to be inserted and fixed thereto (FIG. 8).

The diffusion plate 420 is disposed on the light source unit 450. The diffusion plate 420 is configured to receive light emitted from the light source unit 450 and diffuse the light. That is, the diffusion plate 420 plays a role in improving luminance uniformity of light emitted from the light source unit 450. In more detail, the diffusion plate 420 allows a bright spot produced by the arrangement of the light sources 451 to be invisible from the front side of the display device. In some embodiment, the diffusion plate 420 may be spaced apart from the light source unit 450 having a predetermined gap with an air layer formed therebetween.

The diffusion plate 420 is fixed to the mold frame 300. The diffusion plate 420 may be provided in a quadrilateral-plate form like the display panel 200. However, embodiments of the present invention are not limited thereto, and thus in a case where an LED is used as the light source 451, the diffusion plate 420 may be provided in many different forms and may include predetermined grooves, protrusions, or the like depending on the position of the light source 451.

The diffusion plate 420 is described as a plate for ease of description, but it may be provided in a form of a sheet or a film to achieve slimness of display devices. That is, the diffusion plate 420 is to be understood as having a concept that includes not only a plate but also a film for guiding light.

The diffusion plate 420 may be formed of a light-transmissive material including, for example, acrylic resins, such as polymethylmethacrylate (PMMA), or polycarbonate (PC) so as to guide light efficiently.

The optical sheet 410 is disposed on the diffusion plate 420 and is configured to diffuse and/or collect light transmitted from the diffusion plate 420. The optical sheet 410 may include a diffusion sheet, a prism sheet, and a protective sheet. The diffusion sheet is configured to disperse light incident from the diffusion plate 420 so as to prevent the light from being partly concentrated. The prism sheet may include prisms having a triangular cross-section and formed in a predetermined array on one surface thereof. The prism sheet is disposed on the diffusion sheet and may collect light diffused from the diffusion sheet in a direction perpendicular to the display panel 200. The protective sheet may be formed on the prism sheet and may serve to protect a surface of the prism sheet and diffuse light to achieve a uniform light distribution.

The reflective sheet 430 is disposed between the light source unit 450 and the bottom chassis 440. The reflective sheet 430 reflects light emitted downwards from the diffusion plate 420 to the display panel 200, thereby improving light efficiency.

The reflective sheet 430 may have a bottom portion and an inclined portion extended from the bottom portion forming an obtuse angle with the bottom portion. The bottom portion of the reflective sheet 430 may be seated on the bottom chassis 440 and the inclined portion of the reflective sheet 430 may be disposed on the mold frame.

The reflective sheet 430 may be formed of, for example, polyethylene terephthalate (PET) so as to possess reflectance property. One surface of the reflective sheet may be coated with a diffusion layer containing, for example, titanium dioxide.

In an embodiment, the reflective sheet 430 may be formed of a material containing a metal, such as silver (Ag).

The bottom chassis 440 accommodates the reflective sheet 430 and the diffusion plate 420. A bottom surface of the bottom chassis 440 is formed in parallel with the diffusion plate 420. The bottom chassis 440 may be formed of a metal material having rigidity, such as stainless steel, or a material having good heat dissipation properties, such as aluminum or an aluminum alloy. The bottom chassis 440 is responsible for maintaining a framework of the display device and protecting a variety of elements accommodated therein.

With the above-described structure of the display device, in order to have the mold frame 300 not be seen from the outside and stably fix, hold or support the diffusion plate 420, the mold frame 300 is transparently manufactured and the form of the mold frame 300 is modified. Hereinafter, the mold frame 300 according to an embodiment of the present invention will be described with reference to FIGS. 3 and 4.

Figure 3:
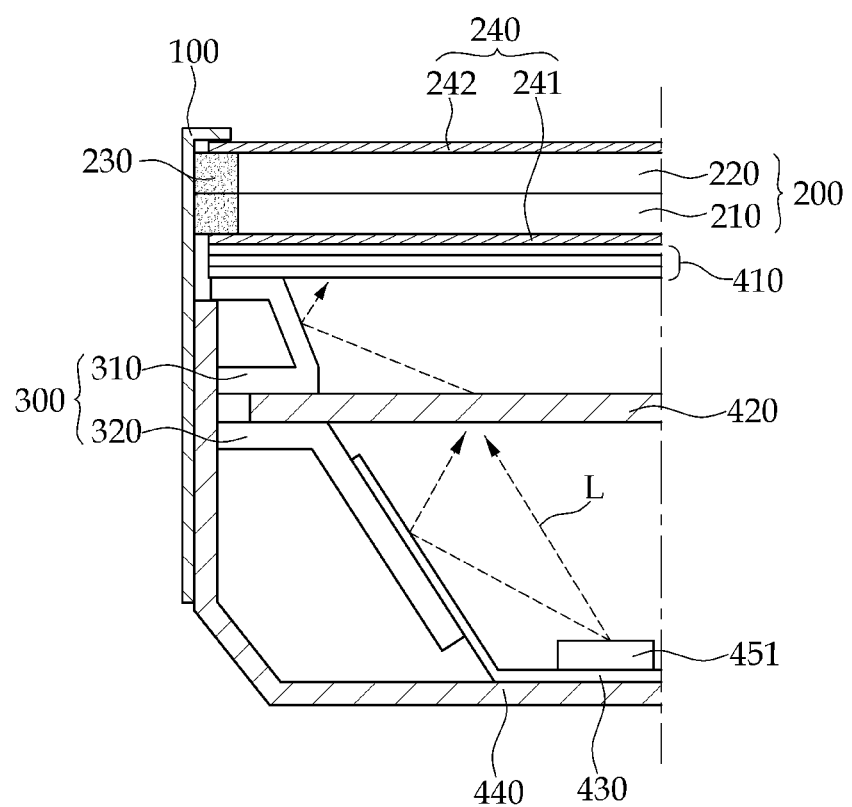
FIG. 3 is a cross-sectional view enlarging a conventional display device.
Figure 4:
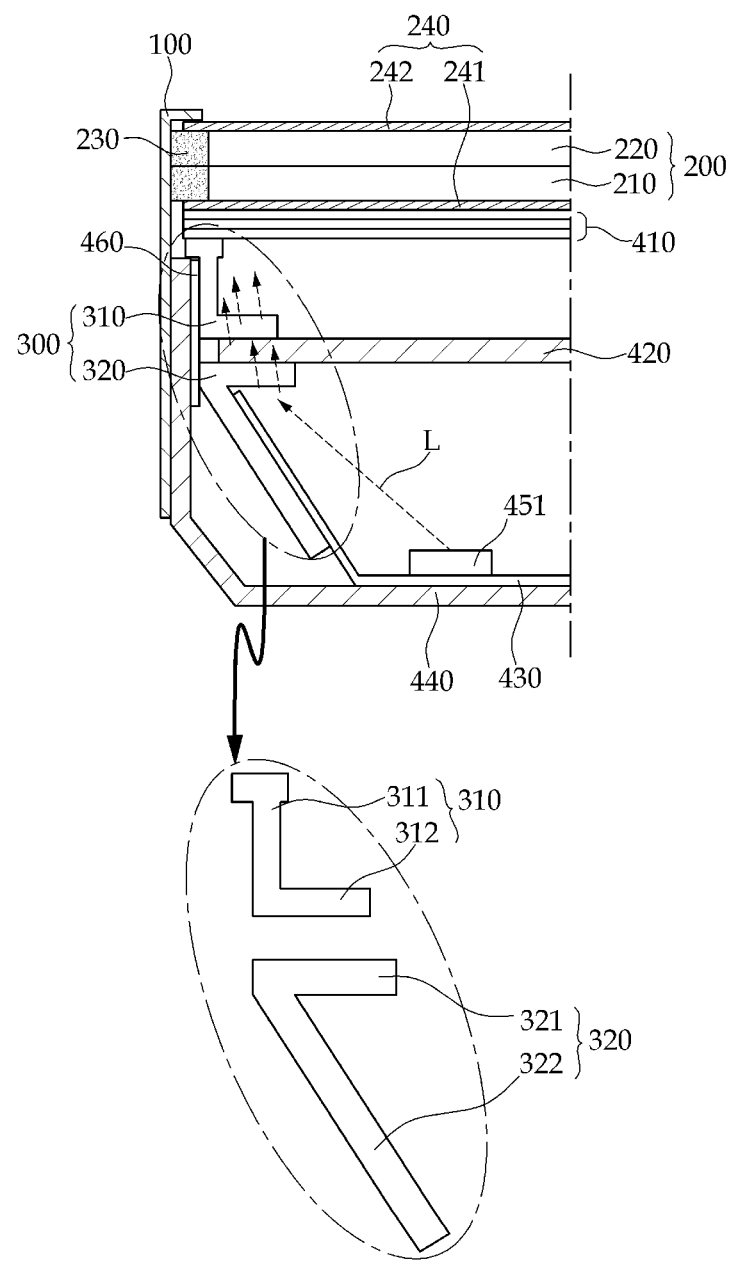
FIG. 4 is a cross-sectional view enlarging an A part of FIG. 2.

FIG. 3 is a cross-sectional view enlarging a conventional display device. FIG. 4 is a cross-sectional view enlarging an A part of FIG. 2.

Referring to FIG. 3, a conventional mold frame 300 stably fixes the diffusion plate 420 and has an inclined portion to secure a space required for heat expansion of the diffusion plate 420. That is, in order to manufacture the conventional mold frame 300, an upper mold and a lower mold are separately manufactured and the diffusion plate is inserted and fixed between the upper mold and the lower mold. However, there has been a problem of being able to see a part of the inclined portion of the mold frame 300 that is configured to stably fix the diffusion plate 420 from the display area of the display panel 200.

Therefore, according to an embodiment of the present invention, the mold frame 300 is formed of a light-transmissive material and the form of the inclined portion of the upper mold is modified.

Referring to FIG. 4, the mold frame 300 according to an embodiment of the present invention may be formed of a transparent material, such as acrylic or methacrylic resins.

The mold frame 300 includes a first mold unit 310 and a second mold unit 320.

The first mold unit 310 has a side surface portion 311 supporting the display panel 200 and the optical sheet 410 and a first protrusion 312 extended from the side surface portion to fix the diffusion plate 420.

The side surface portion 311 of the first mold unit 310 is in contact with the bottom chassis 440 and disposed in the non-display area 230. Therefore, unlike the conventional mold frame, the inclined portion of the first mold unit 310 does not protrude toward the display area of the display panel 200, thereby not seen as the dark area.

The second mold unit 320 has a second protrusion 321 on which the diffusion plate 420 is mounted and a lower portion 322 extended from the second protrusion 321 forming an acute angle with the second protrusion 321. The reflective sheet 430 may be mounted on the lower portion 322.

The first mold unit 310 and the second mold unit 320 form an obtuse angle. For example, the side surface portion 311 and the lower portion 322 form an obtuse angle.

In an embodiment, as the mold frame 300 is transparently formed, a part of light may escape through side surfaces of the bottom chassis 440 instead of propagating toward the display panel. Therefore, a reflective sheet 460 is disposed between the bottom chassis 440 and the mold frame 300.

The reflective sheet 460 is formed of the same material, including non-transparent substantially reflective material such as mirror material, as the reflective sheet 430 disposed under the light source unit 450. The reflective sheet 460 may be disposed between the side surface portion 311 of the first mold unit 310 and the bottom chassis 440.

In other words, unlike the conventional display device, in the display device according to an embodiment of the present invention, the side surface portion 311 of the first mold unit 310 is disposed in contact with the bottom chassis 440 as closely as possible to correspond to the non-display area 230, the mold frame 300 is transparently manufactured, and the reflective sheet 460 is interposed between the bottom chassis 440 and the mold frame 300 for reflecting the light passing through the mold frame. Accordingly, the mold frame 300 of the display device is not seen as a dark area and is not visible from the outside, and the diffusion plate 420 is stably fixed to, held by or supported by the mold frame 300, securing a heat expansion space between the diffusion plate 420 and the bottom chassis 440. Hereinafter, another embodiment of the present invention will be described with reference to FIG. 5.

Figure 5:
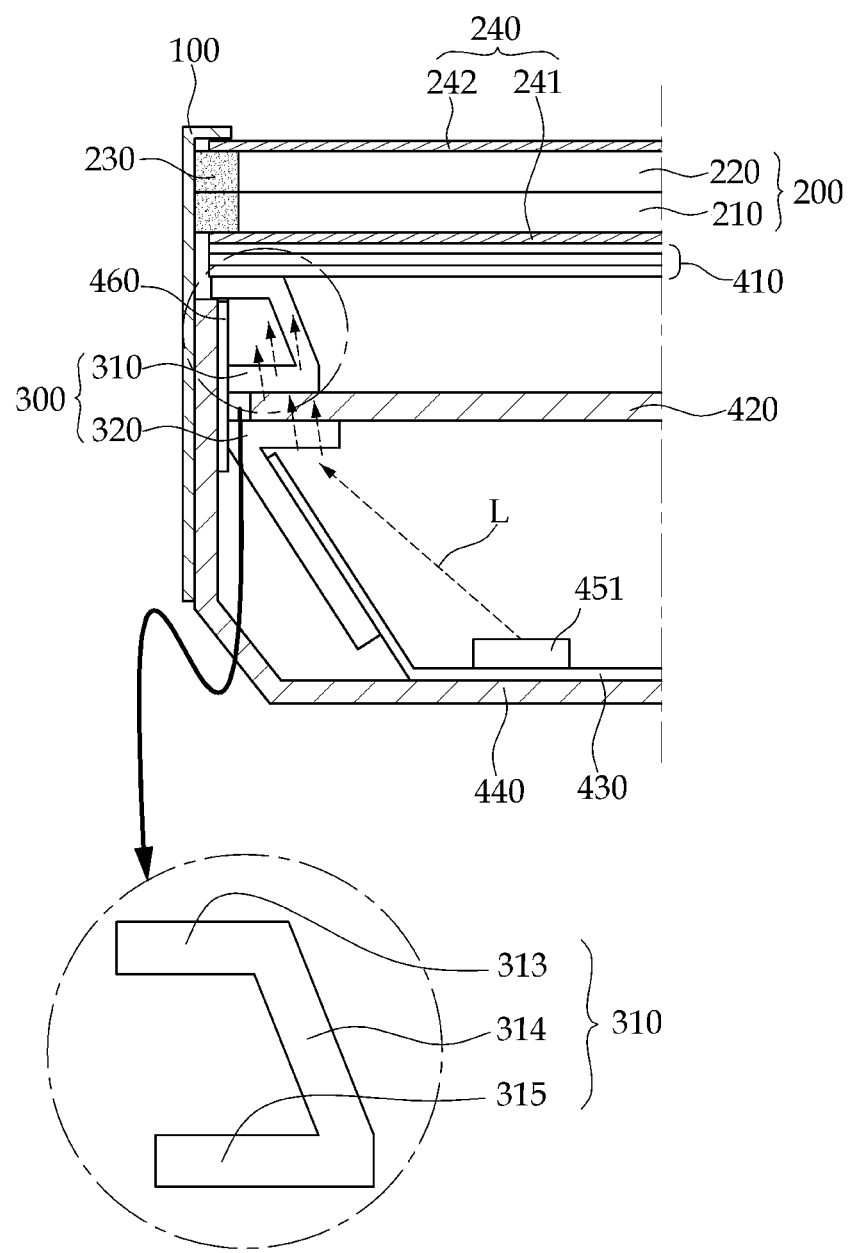
FIG. 5 is a cross-sectional view enlarging a display device according to another embodiment of the present invention.

FIG. 5 is a cross-sectional view enlarging a display device according to another embodiment of the present invention.

Referring to FIG. 5, a mold frame 300 includes a first mold unit 310 having an upper portion 313 configured to support the display panel 200, a side surface portion 314 extended from the upper portion 313, and a first protrusion 315 extended from the side surface portion 314 and configured to fix the diffusion plate 420.

The mold frame 300 of FIG. 5 is made of a transparent material and formed having a structure where an inclined surface of the first mold unit 310 protrudes toward the display area.

Hereinafter, yet another embodiment of the present invention will be described with reference to FIG. 6.

Figure 6:
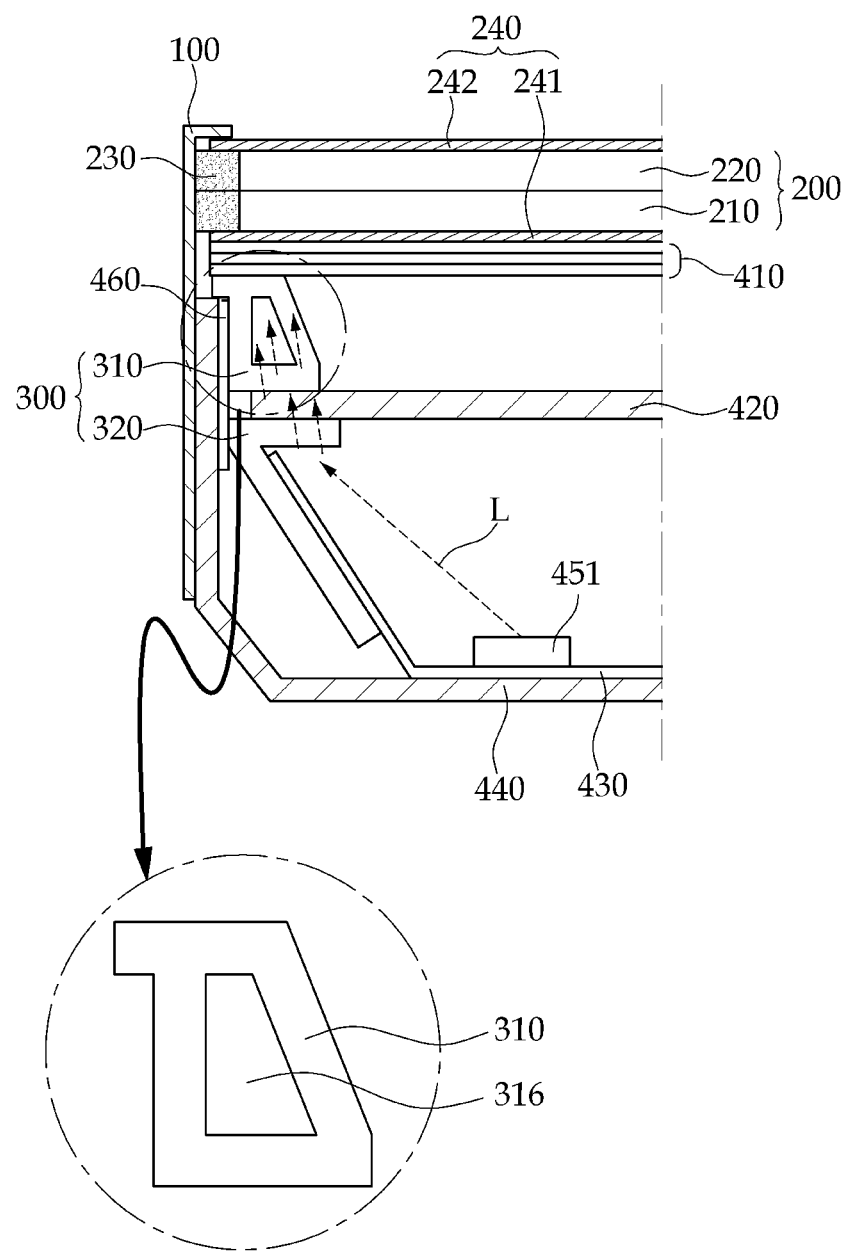
FIG. 6 is a cross-sectional view enlarging a display device according to yet another embodiment of the present invention.

FIG. 6 is a cross-sectional view enlarging a display device according to yet another embodiment of the present invention.

Referring to FIG. 6, a mold frame 300 has a hole 316 inside and includes a first mold unit 310 configured to fix the diffusion plate 420.

The mold frame 300 of FIG. 6 is made of a transparent material and has a structure where rigidity is improved compare to the mold frame 300 of FIG. 4.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A display device comprising:
   a display panel having a display area and a non-display area;
   a light source unit configured to supply light to the display panel;
   a bottom chassis on which the light source unit is disposed;
   a mold frame coupled to the bottom chassis; and
   a diffusion plate inserted into the mold frame and configured to emit light emitted from the light source unit to the display panel, wherein the mold frame is transparent.

2. The display device of claim 1, wherein the display panel is mounted on the mold frame.

3. The display device of claim 2, wherein the mold frame comprises:
   a first mold unit having a side surface portion supporting the display panel and a first protrusion extended from the side surface portion and configured to fix the diffusion plate; and
   a second mold unit having a second protrusion on which the diffusion plate is mounted and a lower portion extended from and forming an acute angle with the second protrusion.

4. The display device of claim 3, wherein the first mold unit and the second mold unit form an obtuse angle.

5. The display device of claim 4, wherein the side surface portion and the lower portion form an obtuse angle.

6. The display device of claim 4, wherein the side surface portion is in contact with the bottom chassis.

7. The display device of claim 6, wherein the side surface portion is disposed in the non-display area.

8. The display device of claim 7 further comprises a reflective sheet disposed between the bottom chassis and the side surface portion.

9. The display device of claim 3 further comprises a reflective sheet disposed between the bottom chassis and the side surface portion.

10. The display device of claim 1 further comprises a reflective sheet disposed between the bottom chassis and the mold frame.

11. The display device of claim 1, wherein the mold frame comprises:
    a first mold unit having an upper portion supporting the display panel, a side surface portion extended from the upper portion, and a first protrusion extended from the side surface portion and configured to fix the diffusion plate; and
    a second mold unit having a second protrusion on which the diffusion plate is mounted and a lower portion extended from and forming an acute angle with the second protrusion.

12. The display device of claim 1, wherein the mold frame comprises:
    a first mold unit having a hole inside and configured to fix the diffusion plate; and
    a second mold unit having a protrusion on which the diffusion plate is disposed and a lower portion extended from and forming an acute angle with the protrusion.

13. The display device of claim 12 further comprising an optical sheet disposed between the display panel and the first mold unit.

14. The display device of claim 13, wherein the optical sheet is mounted on the first mold unit.

15. The display device of claim 1 further comprises a top chassis covering side surfaces of the bottom chassis and a part of a top surface of the display panel.

16. The display device of claim 1, the light source unit includes a plurality of light sources spaced apart from each other having a uniform gap in width and length directions in a matrix form.

17. The display device of claim 1, the light source unit includes a plurality of light sources disposed in a row in a length direction and disposed in zigzag in a width direction.

18. The display device of claim 1, the light source unit includes a plurality of light sources disposed in a row in a width direction and disposed in zigzag in a length direction.

19. The display device of claim 1, the light source unit includes a plurality of light sources disposed on circuit substrates, each of the circuit substrates having a reflective surface.

20. The display device of claim 19, a coupling hole is formed on the circuit substrates to allow a coupling member to be inserted.

* * * * *